Feb. 13, 1934.    T. R. THOMAS    1,946,507
CLUTCH CONTROL LUBRICATION
Filed Nov. 30, 1928    4 Sheets-Sheet 1
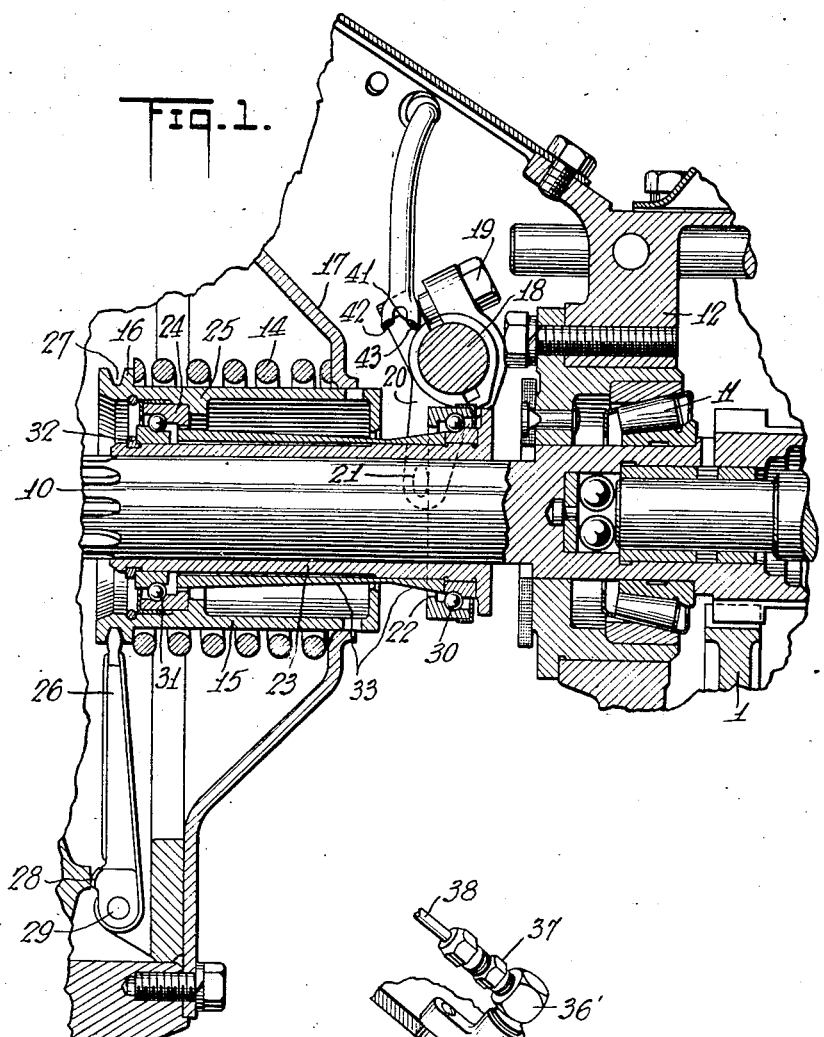
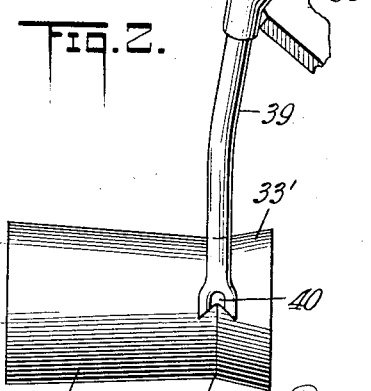
INVENTOR
Thomas R. Thomas
BY
Dean, Fairbank, Obrieg &t &Hirsch
his ATTORNEYS.

INVENTOR
*Thomas R. Thomas*
BY
*Dean, Fairbank, Obright & Hirsch*
his ATTORNEYS.

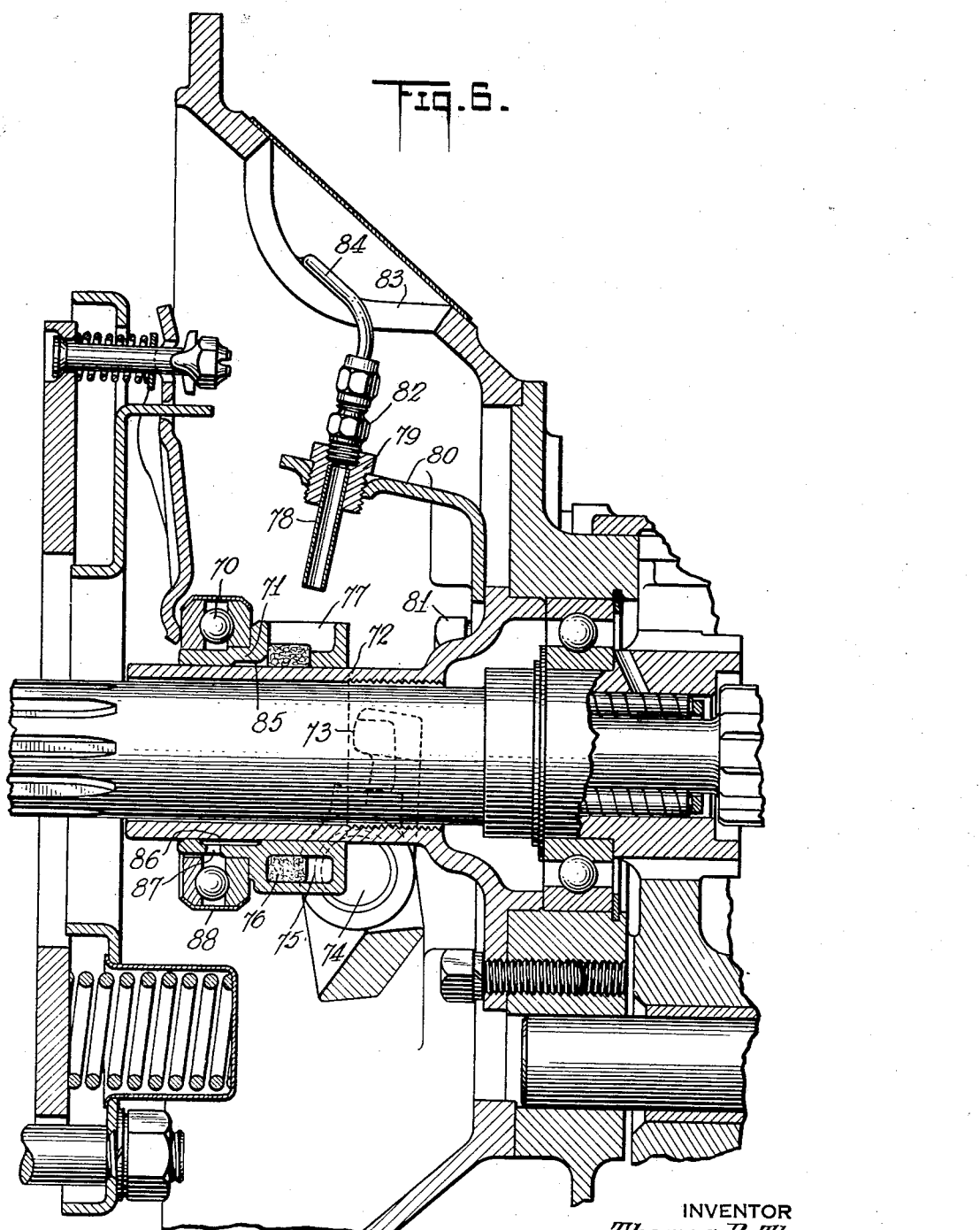

Feb. 13, 1934.  T. R. THOMAS  1,946,507
CLUTCH CONTROL LUBRICATION
Filed Nov. 30, 1928  4 Sheets-Sheet 4
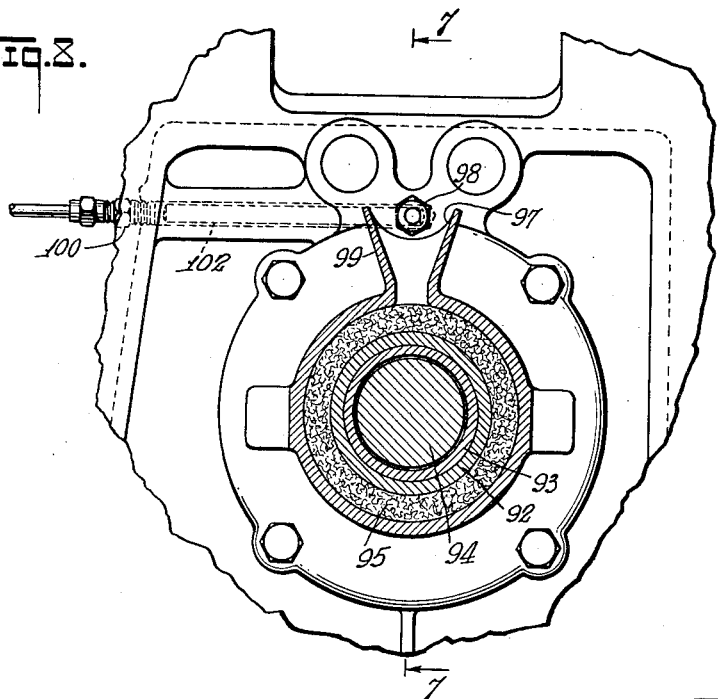
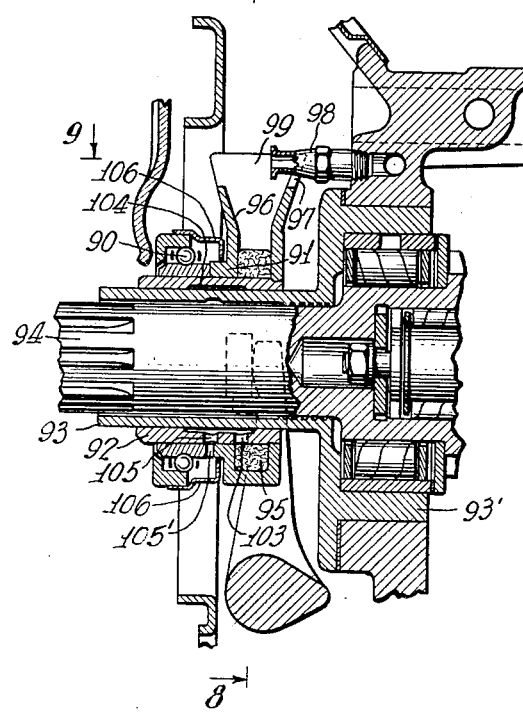
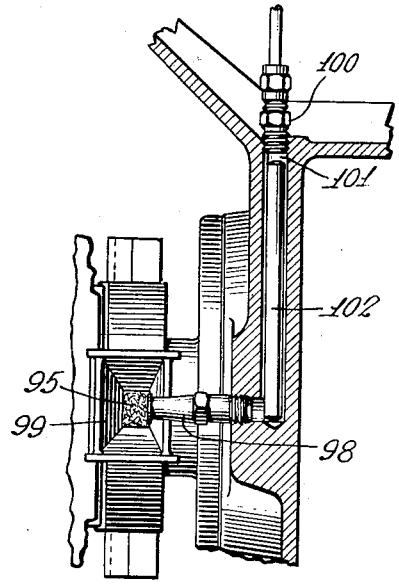
INVENTOR
*Thomas R. Thomas*
BY
*Dean, Fairbank, Obrieght & Hirsch*
his ATTORNEYS Patented Feb. 13, 1934

1,946,507

UNITED STATES PATENT OFFICE 1,946,507

CLUTCH CONTROL LUBRICATION

Thomas R. Thomas, New York, N. Y., assignor to Auto Research Corporation, a corporation of Delaware Application November 30, 1928
Serial No. 322,869
39 Claims. (Cl. 192—113)

It is among the objects of the present invention to provide an arrangement for properly oiling the clutch release bearings of a motor vehicle, while dispensing both with the storage of a substantial supply of oil in the clutch case and with the need for manual access to the bearings within the clutch case.

Among the objects are to provide an arrangement of the above type, the installation of which involves but little cost, which presents no exposed or protruding parts subject to injury in use, and which reliably conveys the oil to bearing surfaces in contiguity to dry clutch surfaces without wetting the latter and without the need for reorganizing the clutch or shaft construction or boring or weakening the same for delivery of the oil.

According to the invention, the lubricant for the clutch release bearing, is admitted through an inlet in the clutch case, said inlet preferably a drip plug fed from the same central lubricating system, from which various other bearings are simultaneously supplied. The lubricant from the drip plug is passed through a pipe or conduit wholly enclosed within the case, the outlet of said conduit delivering to the clutch release bearing. In a preferred construction, the drip plug feeds through a nozzle which drips upon a part of the clutch release collar, so constructed as to intercept the drip in all settings of said collar and to deliver the oil axially thereof to the clutch release slide bearing or the associated thrust bearing or bearings, or to both the slide and the thrust bearing.

In one construction, the rotating structure of the release collar is of conical or outwardly flaring form, so that the lubricant intercepted at the narrow part thereof is fed outward and longitudinally to the bearing surface or surfaces at the wider end or ends thereof.

In another type of construction, the nozzle drips to a wick, preferably peripherally of the collar and retained in a corresponding groove therein, said wick draining laterally through corresponding ports into the associated clutch release bearing. Preferably, the clutch release thrust bearing is sufficiently encased so that lubricant fed thereto by the conical or wick deflector is spread over the entire bearing surface thereof in the course of operation.

In the accompanying drawings in which are shown various possible embodiments of the several features of the invention.

Fig. 1 is a fragmentary sectional view of a clutch, showing one embodiment of clutch release lubricating arrangement thereon, Fig. 2 is a fragmentary detail plan view thereof, partly in section, Fig. 3 is a fragmentary plan view of another embodiment, Fig. 4 is a sectional view taken on the line 4—4 of Fig. 3, Fig. 5 is a sectional view taken on line 5—5 of Fig. 4, Fig. 6 is a fragmentary view in longitudinal cross-section of a further embodiment.

Fig. 7 is a fragmentary view in longitudinal cross-section of another embodiment.

Fig. 8 is a sectional view taken on line 8—8 of Fig. 7, and;

Fig. 9 is a transverse sectional view taken on line 9—9 of Fig. 7.

Figure 3:
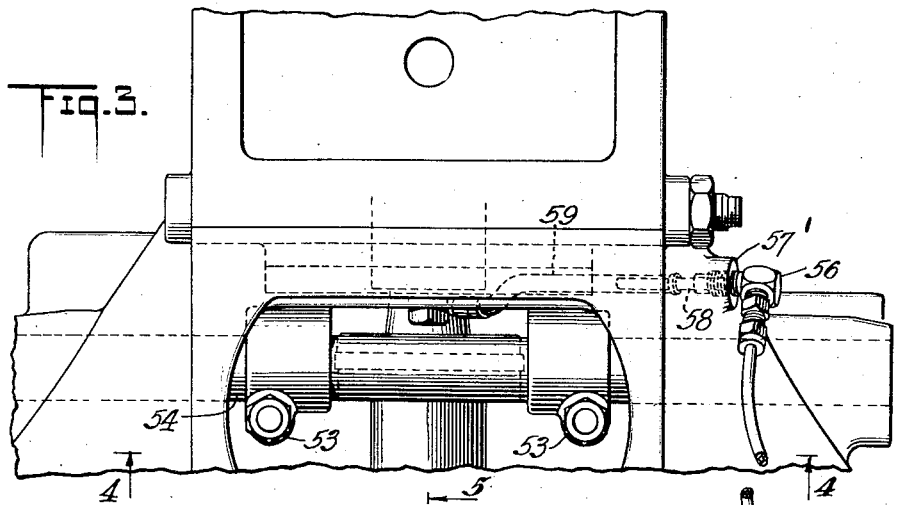

Referring now to Figs. 1 and 2 of the drawings, there is shown a fragment of a well-known type of clutch construction, including a main shaft 10 having a bearing 11 in the front wall of the transmission case 12. The clutch is normally maintained closed by a coil spring 14 encircling the clutch collar 15 and reacting at one end against the flange 16 thereof and at the other against the clutch spider 17. The clutch is released by pressure on the usual clutch pedal (not shown) which operates the clutch release rock shaft 18, to which is clamped as at 19 the clutch release fork 20 having lugs 21 reacting against the shoulder 22 presented by ball bearing 30 on a sliding clutch release collar 23 which encircles the main shaft 10. Ball bearing 31 presents a shoulder adjacent a flange 25 internally of the clutch collar 15. Shift of collar 23 releases the clutch through the operation of lever 26, having its free end in groove 27 of flange 16 and presenting an operating cam 28 near the pivot 29 thereof. Ball bearing 30 prevents friction between the running clutch and the fork 21.

Similarly ball bearing 31 reduces friction in the relative rotation between the spider 17 and sleeve 23 in closing or opening the clutch.

In order to convey lubricant to the two ball bearings 30 and 31 of the construction thus far described, which in itself is not claimed herein, I provide a double conical sleeve 33', 33² rigidly fixed preferably frictionally about sleeve 23 and sloping outwardly from a median constriction or trough 34 constituting the common base of the double cone to the bearing 30 at one end and to the bearing 31 (which in this case is more remote) at the other end. The conical element 33 serves as the means for conveying lubricant drip by centrifugal force outwardly and longitudinally to pass off from the ends thereof into the associated ball bearings.

For conveying the lubricant to the conical sleeve, I provide a fitting 36 on the clutch case, to which is connected an elbow adapter 36' into which is screwed one of the drip plugs 37, supplied from the end 38 of the pipe distributing system. Fitting 36 extends downward into the clutch case and has an outlet pipe 39 dripping through a dividing nozzle 40 to supply lubricant directly upon the respective cones 33', $33^2$ and near the common reduced base 34 thereof.

The dividing nozzle may be and preferably is of the construction disclosed and claimed in the copending application of Joseph Bijur Serial No. 313,262 filed Oct. 18, 1928. It need, therefore, be but briefly stated that this nozzle is formed preferably by flattening medianly the lower end of the pipe 39 with a U-shaped die and preferably notching the extremity as at 41 to form a fish tail, affording a pair of lateral nozzles 42 and 43 at the inlets to which the lubricant will divide. The nozzles are positioned as shown best in Fig. 2, and are spaced sufficiently to assure drip to opposite sides of reduced base 34 in all positions of setting or adjustment of the clutch release collar.

In operation, it will be clear that upon actuation or functioning of the central lubricating system, the appropriate amount of oil will pass by the drip plug 37 and will trickle down the pipe 39 dividing equally between the nozzles 42 and 43 to drip upon the respective cone surfaces of the collar 33 as best appears in Fig. 2. In the revolution of the shaft 10 and with it of the clutch release collar 23 and the cone element thereof, 33', $33^2$, the lubricant that has trickled upon said respective cone portions will be urged radially outward by centrifugal force, the viscosity of the oil, however, preventing its separation from the sleeve. Accordingly, the oil will creep outward along the conical collar element to the very extremities thereof, from which it passes off into the respective ball bearings 30 and 31.

Figure 4:
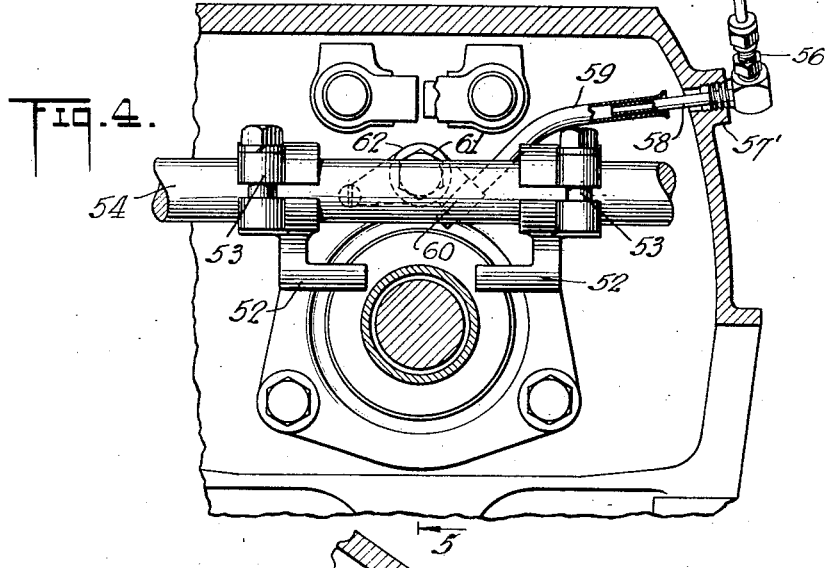
Figure 5:
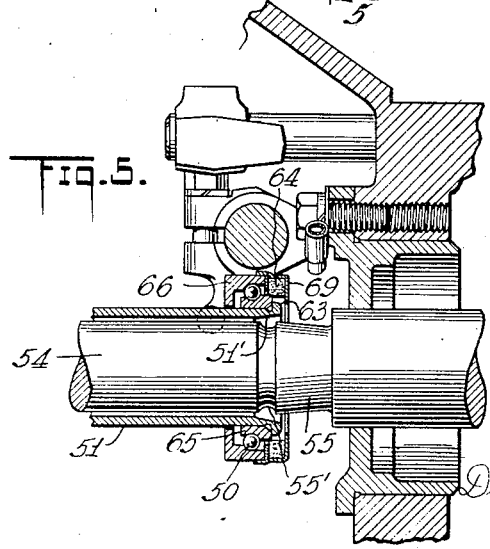

In the embodiment of Figs. 3, 4 and 5, the ball bearing element 50 of the clutch release collar 51 is slid to release the clutch by operation of a pair of fingers 52 clamped by respective compression collars 53 about the rock shaft 54 which is actuated from the clutch pedal (not shown). In this embodiment, the clutch shaft 54 has a short conical length 55 with its wider end peripherally grooved at 55' adjacent the ball bearing and serving to feed lubricant dripped thereonto longitudinally into the bearing by substantially the same principle as in the embodiment of Figs. 1 and 2. Collar 51 is internally flared at 51' to feed the lubricant supplied thereto outward to the extremity of the sleeve, from which it creeps into the ball bearing.

The ball bearing 50 is preferably held in place upon the collar 51 by a shoulder 63 on the extremity of the latter. A felt ring 64 preferably encircles the inner race 65 of the ball bearing and is held against the end of the outer race 66 thereof by the flange of a capsule 69 enclosing said felt ring.

In the present embodiment, the drip plug 56 is threaded into an elbow 57 which in turn is threaded directly into a boss 57' formed on the clutch case. A short outlet pipe 58 is fixed into elbow 57 and protrudes into the clutch case. The free extremity of the nozzle pipe 59 is retained by an eye 60 on a bracket 62 secured by screw 61 to the rear face of the clutch case. Pipe 59 is thus preassembled within the clutch case and the application of fitting 57 completes the assembly by freely telescoping pipe 58 into the upper end of pipe 59.

In operation, lubricant that has passed the drip plug, is fed through pipe 58 and nozzle pipe 59 to drip onto the reduced end of the conical shaft portion 55 along which the lubricant will pass by centrifugal force to the groove 55' from which the lubricant passes outward along conical flare 51' and thence creeps outward around shoulder 63 and into the ball bearing. The felt ring 64 seeps up any excess lubricant which it may feed past the inner rim of capsule 69 into the ball bearing.

In the embodiment of Fig. 6, the ball bearing 70 is supported on the clutch release collar 71, which in this case encircles the fixed bearing 72. Collar 71 is shifted, for releasing the clutch by the fork 73 on the clutch release rock shaft 74. In the present embodiment, the collar 71 is a casting formed with an annular hollow 75 therein filled with a corresponding wick 76, the collar being formed with a lubricant inlet 77 at its uppermost or outermost part, through which a corresponding area of the felt ring 76 is exposed. The wick is fed with lubricant supplied through a nozzle pipe 78 which in this instance, is shown mounted in a bushing 79 threaded into a bracket 80 clamped by screws 81 to the clutch case. The bushing 79 mounts the drip plug 82, the clutch case having an opening 83 therein through which the lubricant feed pipe 84 leads to the drip plug.

The lubricant is fed from the annular wick 76 to oil the contiguous slide bearing, by flow into an annular groove 85 at the inner periphery of the collar 71 and contiguous to the wick, said groove being widened at 86 at its lowermost part, and draining therefrom through a small port 87 into the ball bearing 70. The ball bearing has a sheet metal rim 88 to prevent leak therefrom, so that the lubricant deposited into the lower part of the ball bearing will be sloshed around for lubricating all parts thereof.

Lubricant passed through the nozzle 78 will, in operation, drop onto the annular felt 76 and drain therefrom through the only path available into the annular groove 85 to lubricate the slide bearing and thence through port 87 to the ball bearing 70.

In the embodiment of Figs. 7, 8 and 9, the ball bearing 90 and the lubricant supply structure 91 are both mounted side by side upon a support ring 92, on the sleeve 93 which constitutes an integral extension of transmission bearing retainer 93'. The annular felt 95 is maintained in position in a corresponding groove in the interior of ring 91, said groove inwardly closed by the support collar 92. The upper part of the ring 91 is formed as a hopper or funnel 96 protruding upward therefrom and affording a notch 97 through which passes the feed nozzle 98, which in this case extends horizontally inward from the rear wall of the clutch case. The sides 99 of the hopper 96 extending above the nozzle, serve as a wind-guard to prevent blowing the drip clear of the wick due to the draft engendered in the adjacent revolving clutch structure. A drip plug 100 in the outer wall of the case, delivers through a horizontal bore 101 to the nozzle 98. Bore 101 is preferably substantially filled with a pin 102, thereby to reduce the effective volume of the bore and cause the feed from the drip plug promptly to reach the nozzle. The lubricant is supplied from the wick 95 to the slide bearings by flow through a port 103 in the lowermost part of the collar 92, which has a peripheral inner groove 104 therein along which the lubricant passes to a port 105, 105' feeding outward into an end cap 106 of the ball bearing 90.

In both the embodiment of Fig. 6 and that of Figs. 7 to 9, lubricant is reliably intercepted from the nozzle by felt in all settings or adjustments of the clutch release collar, since the inlet is formed of sufficient width to maintain the registry thereof with the nozzle end at all time, even though the clutch collar has been shifted leftward to the limit for wear compensation.

I claim:—

1. The combination of a clutch case, a shaft therein having a slidable clutch release collar thereon, and means for conveying lubricant to said collar, said means comprising a lubricant inlet fixed on the case, a peripheral receiver adjacent said collar and substantially inside of the part to receive lubricant, a conduit extending from said inlet, terminating shortly above said receiver and dripping thereonto and means associated with for delivering lubricant therefrom to the inside of said bearing.

2. A clutch of the type comprising a clutch case, a clutch shaft therein and a clutch release collar encircling said shaft; the combination therewith of means for lubricating the bearing of the clutch release collar from an external source, said means comprising a fixed lubricant inlet at a part of the clutch case above the level and to the side of the collar and a rigid pipe extending inwardly and downwardly from said inlet within said clutch case terminating a short distance above the collar and dripping lubricant upon the clutch release collar.

3. A motor vehicle clutch of the type comprising a clutch case, a clutch shaft and a clutch release collar having a bearing and encircling said shaft and substantially inside of said bearing; the combination therewith of means for lubricating said release collar, comprising a lubricant inlet at the clutch case and a lubricant conduit extending within said clutch case and having a drip outlet above the clutch shaft and an enclosure alongside of and extending peripherally around said bearing, said enclosure including an inlet for the drip and means peripherally of said collar for delivering the drip to the bearing of said collar, whereby the centrifugal force incident to movement of the bearing will cause the lubricant to move outwardly from inside the bearing, and through the bearing to the outside thereof.

4. A motor vehicle clutch of the type comprising a clutch case, a clutch shaft and a clutch release collar having a bearing and encircling said shaft; the combination therewith of means for lubricating said release collar, said means comprising a nozzle supported within the case, substantially above said shaft, said shaft having means rotating therewith for delivering the drip to the bearing of said collar, means for applying lubricant to said nozzle from the exterior of said case, said means comprising an inlet fitting on the case and a conduit in protected position within the case, delivering to said nozzle.

5. In a motor vehicle clutch of the type comprising a clutch case, a clutch shaft, a clutch release collar encircling said shaft and a thrust bearing between the clutch and the release collar; the combination therewith of means for lubricating said collar and said bearing; said means comprising a supply fitting at the exterior of the clutch case, a nozzle supplied therefrom and extending within the clutch case, to drip upon a part revolving with said shaft and rearwardly of said thrust bearing, said revolving part having means feeding lubricant dripped thereonto forward to said thrust bearing.

6. A motor vehicle clutch of the type comprising a clutch case, a clutch shaft and a clutch release collar having a bearing and encircling said shaft; the combination therewith of means for lubricating said release collar comprising a lubricant inlet at the clutch case, and a lubricant conduit extending within said clutch case and having a drip outlet, peripheral means carried by said collar inside of said bearing and intercepting the drip, and means for delivering the intercepted lubricant to the bearing of said collar.

7. In a motor vehicle clutch construction of the type comprising a clutch shaft, a clutch release collar on said shaft and a thrust bearing disposed at one end of said collar; the combination therewith of a fitting extending within the clutch case, a nozzle pipe fitted in said fitting and above said collar and dripping thereonto and a feed pipe having an inlet at the exterior of said casing and feeding to said nozzle, said collar having flow directing means to feed laterally to said thrust bearing, lubricant delivered thereto from said nozzle.

8. A motor vehicle clutch of the type comprising a clutch case, a clutch shaft and a clutch release collar having a bearing and encircling said shaft; the combination therewith of means for lubricating said release collar comprising a lubricant inlet at the clutch case, and a lubricant conduit extending within said clutch case and having a drip outlet above the clutch shaft, said shaft having means rotating therewith, feeding the lubricant longitudinally thereof to said bearing.

9. In apparatus of the character described, a rotary shaft, a bearing member encircling the same, an enclosure for said shaft and said bearing, a drip nozzle within said enclosure, supplied from the exterior thereof, and draining directly upon a portion rotating with said shaft and beyond said bearing member, said portion flaring outwardly toward and terminating inside of said bearing member, the drip from said drip nozzle occurring in the form of discrete drops which fall upon said flared portion on its upper portion at a place beyond its smallest diameter.

10. In a clutch for a motor vehicle, the combination of a clutch case, a rotating shaft, a clutch release collar slidable thereon and including a thrust bearing, a drip nozzle supplied from the exterior of the clutch case and arranged to drip upon a part rotating with the shaft, and spaced from said thrust bearing, said rotating part flaring outward from the point of drip interception to the interior of the thrust bearing, the drip from said drip nozzle occurring in the form of discrete drops which fall upon said flared portion on its upper portion at a place beyond its smallest diameter.

11. In a motor vehicle clutch construction of the type comprising a clutch shaft, a clutch release collar on said shaft and a thrust bearing disposed at one end of said collar; the combination therewith of a nozzle within said casing disposed to drip upon said collar, and flow directing means to feed longitudinally thereof toward said thrust bearing, the lubricant dripped onto said collar.

12. In a motor vehicle clutch construction of the type comprising a clutch shaft, a clutch release collar on said shaft, and a thrust bearing disposed at one end of said collar; the combination therewith of a nozzle extending above and dripping upon said release collar, a conduit leading from the exterior of the clutch case to said nozzle to feed the latter, said collar having flow directing means to feed laterally to said thrust bearing, lubricant dripped onto said collar.

13. In apparatus of the character described, the combination of a shaft, a pair of spaced bearings associated therewith, a case enclosing said shaft and said bearings, means for feeding lubricant to said bearings, said means comprising a feed conformation rotating with said shaft and having a constricted median portion and flaring outward to the bearing ends and means supplied from the exterior of said case and including a twin drip nozzle arranged to drip to opposite sides of said median portion, the drip from said drip nozzle occurring in the form of discrete drops which fall upon said flared portion on its upper portion at a place beyond its smallest diameter.

14. In a clutch of the type comprising a drive shaft, a clutch release collar thereon including a sleeve fitted on said shaft, a control collar about said sleeve having a ball bearing support thereon, said sleeve having a second ball bearing beyond said control collar through which the clutch release thrust is applied, said sleeve having an exterior conformation comprising a constricted median portion, and outwardly flaring conical portions with their wider ends leading into the ball bearings, said median portion being exposed beyond said control collar, a twin drip nozzle structure dripping to opposite sides of said median portion and a drip plug at the exterior of said case supplying said feed nozzle.

15. In a motor vehicle clutch of the type comprising a clutch case, a clutch shaft, a clutch release collar encircling said shaft, and a thrust bearing between the clutch and the release collar; the combination therewith of means for lubricating said thrust bearing, said means comprising a capillary member carried by the collar to one side of the thrust bearing, a nozzle dripping onto said capillary member and means directing lubricant from said capillary member to said bearing.

16. In a motor vehicle clutch of the type comprising a clutch case, a clutch shaft, a slidable clutch release collar encircling said shaft and a thrust bearing between the clutch and the release collar; the combination therewith of an annular capillary member disposed in a corresponding cavity in said clutch release collar to one side of said thrust bearing, said capillary member being exposed at the uppermost part thereof, a drip nozzle aligned with said exposed part of the capillary member, said capillary member being in lubricant delivering relation with respect both to the slide bearing of said collar and said thrust bearing.

17. In a motor vehicle clutch of the type comprising a clutch case, a clutch shaft, a clutch release collar encircling said shaft, and a thrust bearing between the clutch and the release collar; the combination therewith of an annular capillary member disposed in a corresponding cavity in said clutch release collar to one side of said thrust bearing, said capillary member being exposed at the uppermost part thereof, a drip nozzle aligned with said exposed part of the capillary member, and a passageway connecting said cavity to drain into the lower part of said thrust bearing.

18. In a motor vehicle clutch of the type comprising a clutch case, a clutch shaft, a slidable clutch release collar encircling said shaft, and a thrust bearing between the clutch and the release collar; the combination therewith of means for lubricating said thrust bearing, said means comprising an annular wick lodged in a corresponding annular cavity in said collar, to one side of said bearing, said collar being open at the uppermost part thereof to expose the corresponding portion of said wick, a lubricant feed nozzle aligned to drip upon said wick, the inlet opening to said collar being of width axially of said collar sufficient to maintain alignment with said nozzle in all positions of said collar, said collar having ducts for feeding lubricant from said wick to the slide bearing of the collar and to the thrust bearing.

19. In a motor vehicle clutch of the character comprising a clutch case, a clutch shaft therein, a clutch release collar slidable on said shaft, and a thrust bearing carried by said collar; the combination therewith of means for lubricating said thrust bearing, said means comprising a wick peripherally of said collar to the rear of said thrust bearing and lodged in a corresponding cavity in said collar, said collar having a hopper opening at the upper part thereof and exposing said wick, a drip nozzle extending above said hopper for supplying lubricant to said wick and means at the exterior of said case for supplying said drip nozzle, said collar having passageways feeding lubricant from said wick to the slide bearing of said collar and to said thrust bearing.

20. In a clutch construction of the type including a clutch case, a clutch shaft, a sliding clutch release collar upon said shaft, and a thrust bearing carried upon said collar at the inner end thereof; the combination therewith of means for lubricating said bearing, said means comprising a wick extending peripherally in a corresponding cavity in said collar to one side of said thrust bearing, said collar having an inner peripheral groove adjacent said wick and in communication therewith, and a passageway for admitting lubricant from said peripheral groove to the lower part of said thrust bearing, said wick exposed at the uppermost part of said collar to intercept lubricant dripped thereonto.

21. In a motor vehicle clutch construction of the type comprising a clutch case, a clutch shaft, a clutch release collar on said shaft and a thrust bearing disposed at one end of said collar; the combination therewith of a nozzle fitted in the end wall of said clutch case and extending longitudinally above said collar to drip thereonto, means feeding said nozzle comprising an inlet fitting at the exterior of the clutch case and a longitudinal bore through said clutch case feeding said nozzle, said collar having directing means for feeding laterally to the thrust bearing, the lubricant dripping thereonto from said nozzle.

22. In a motor vehicle clutch construction of the type comprising a clutch case, a clutch shaft, a clutch release collar on said shaft and a thrust bearing disposed at one end of said collar; the combination therewith of a nozzle fitted in the end wall of said case and extending above the collar to drip thereonto, means feeding said nozzle comprising an inlet fitting at a level no higher than said nozzle and at the interior of said casing, a bore through the casing delivering to said nozzle and a filler core in the bore to reduce the effective volume thereof.

23. In a clutch for a motor vehicle, the combination of a clutch release collar comprising a mounting sleeve, a lubricant feed collar encircling said sleeve, a thrust bearing encircling said sleeve and having end to end contact with said lubricant feed collar, said feed collar having an annular wick in a corresponding cavity therein, said mounting collar having bores near the lower part thereof communicating from the interior periphery of said wick to the interior of said thrust bearing, said lubricant supply collar having an inlet whereby lubricant may be dripped upon said wick.

24. In a clutch for a motor vehicle, the combination of a clutch release collar comprising a mounting sleeve, a lubricant feed collar encircling said sleeve, a thrust bearing encircling said sleeve and having end to end contact with said lubricant feed collar, said feed collar having an annular wick in a corresponding cavity therein, said mounting collar having bores near the lower part thereof communicating from the interior periphery of said wick to the interior of said thrust bearing, said lubricant feed collar having a hopper unitary therewith rising therefrom for intercepting lubricant drip and feeding the same to said wick.

25. In a clutch for a motor vehicle, the combination of a clutch case, a shaft therein, a clutch release collar upon said shaft having an associated thrust bearing member, said shaft including a flaring portion having its larger end adjacent said thrust bearing, and means for supplying lubricant upon the smaller part of said conical shaft portion.

26. In a clutch for a motor vehicle, the combination of a drive shaft, a clutch release collar encircling the same and having a bearing part, said drive shaft having a flaring portion rotating therewith, with its larger end adjacent said bearing part, and a drip nozzle directly above a smaller part of said flaring portion.

27. In a clutch of the type comprising a clutch case, a rotating shaft therein, a clutch release collar thereon having a ball thrust bearing, means for supplying lubricant longitudinally of said shaft past the end of said collar, means for feeding the lubricant about the end of said collar to said ball bearing and a felt ring at the end of said ball bearing to intercept leak.

28. In a clutch of the type comprising a rotating shaft, a clutch release collar encircling the same, a ball thrust bearing near an end of said release collar, said shaft having a conical conformation immediately beyond said release collar and a peripheral groove at the larger end of said conical portion and within said collar, means dripping lubricant upon said conical portion, and means intercepting lubricant drained from said groove to supply the bearing surface.

29. In a clutch of the type comprising a rotating shaft, a clutch release collar encircling the same, a ball thrust bearing near an end of said release collar, said shaft having a conical conformation immediately beyond said release collar, means dripping lubricant upon said conical portion, the end of said collar having an outwardly flaring inner periphery intercepting lubricant from said conical portion and directing the same outward to the ball thrust bearing.

30. In a clutch for a motor vehicle, the combination of a rotating shaft structure, a clutch release collar thereon, means for dripping lubricant onto a part of the rotating shaft structure beyond said collar, said part being formed to feed the lubricant therefrom laterally into said collar, said dripping feed means comprising an inlet fitting at the clutch case, and a nozzle pipe telescoped at its inlet end with respect to said inlet fitting and means retaining the outlet drip end of said nozzle in fixed position above said rotating structure.

31. In a motor vehicle clutch of the type comprising a clutch case, a clutch shaft, a slidable clutch release collar encircling said shaft and a thrust bearing between the clutch and the release collar; the combination therewith of a lubricant receiver disposed to one side of said thrust bearing, a drip pipe aligned with said receiver and means for conducting the received lubricant in series to the slide bearing of said collar and to said thrust bearing.

32. In a motor vehicle clutch of the type comprising a clutch case, a clutch shaft, a slidable clutch release collar encircling said shaft, and a thrust bearing therewith of means for lubricating said thrust bearing, said means comprising an annular receiver associated with said collar, to one side of said bearing, a lubricant feed pipe the outlet end of which is aligned to drip upon said receiver, and ducts in said collar for feeding lubricant from said wick to the slide bearing of the collar and from the slide bearing to the thrust bearing.

33. In a clutch for a motor vehicle, the combination of a clutch release collar comprising a mounting sleeve, a lubricant feed collar encircling said sleeve, a thrust bearing encircling said sleeve, passageways from said collar to the interior of said thrust bearing and a hopper rising from said collar for intercepting lubricant drip and feeding the same to said collar.

34. A lubricating installation for a thrust bearing comprising means to admit lubricant to the inner periphery of the thrust bearing and absorbent means at the outer periphery of the thrust bearing to prevent lubricant from being thrown out of said thrust bearing by centrifugal force.

35. The installation of claim 34 in which the thrust bearing is a ball bearing and the means at the outer periphery consists in part of a sheet metal enclosure.

36. The installation of claim 34 in which the thrust bearing is of the ball bearing type and an annular felt ring is provided at the outer periphery to prevent lubricant from being thrown out of said thrust bearing.

37. A lubricating installation for distributing lubricant along a rotating structure which comprises a series of conical carrying surfaces longitudinal of the rotating structure, means for adding lubricant to the top of a portion of the conical surface in discrete drops beyond its place of smallest diameter and means for taking off lubricant at the portion of conical surfaces of largest diameter, said conical surfaces being placed end to end and joining each other at their smaller diameters.

38. A motor vehicle clutch of the type comprising a clutch case, a clutch shaft and a clutch release collar having a bearing and encircling said shaft; the combination therewith of means for lubricating said release collar, comprising a lubricant inlet at the clutch case and a lubricant conduit extending within said clutch case and having a drip outlet above the clutch shaft, means peripherally of said shaft for delivering the drip to the bearing of said collar and wind guard means to prevent blowing of the drip clear of said peripheral means due to the draft engendered in the adjacent revolving clutch structure.

39. In a lubricating installation for a revolving structure, a peripheral receiver around said revolving structure, a drip nozzle above said revolving structure, a hopper associated with said revolving structure for intercepting lubricant drip and conveying it to said peripheral receiver and a wind guard associated with the top of said hopper for preventing the drip from being blown clear thereof.

THOMAS R. THOMAS.